United States Patent
Wong et al.

(10) Patent No.: US 11,396,188 B2
(45) Date of Patent: Jul. 26, 2022

(54) SELECTABLE FILL MODE OF PRINTING DEVICE HAVING RESERVOIR FILLABLE FROM EXTERNAL COLORANT SUPPLY

(71) Applicant: Hewlett-Packard Development Company, L.P., Spring, TX (US)

(72) Inventors: Howard G Wong, Vancouver, WA (US); Wesley R. Schalk, Vancouver, WA (US); Jesse Otto Sutherland, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/296,191

(22) PCT Filed: May 23, 2019

(86) PCT No.: PCT/US2019/033778
§ 371 (c)(1),
(2) Date: May 21, 2021

(87) PCT Pub. No.: WO2020/236183
PCT Pub. Date: Nov. 26, 2020

(65) Prior Publication Data
US 2022/0072869 A1    Mar. 10, 2022

(51) Int. Cl.
*B41J 2/21* (2006.01)
*B41J 2/175* (2006.01)

(52) U.S. Cl.
CPC .......... *B41J 2/2103* (2013.01); *B41J 2/17506* (2013.01); *B41J 2/17566* (2013.01)

(58) Field of Classification Search
CPC ... B41J 2/2103; B41J 2/17506; B41J 2/17566
See application file for complete search history.

(56) References Cited

U.S. PATENT DOCUMENTS

| | | | |
|---|---|---|---|
| 5,903,292 A | 5/1999 | Scheffelin et al. |
| 7,014,373 B2 | 3/2006 | Piccinino et al. |
| 8,240,793 B2 | 8/2012 | Taga |
| 8,403,468 B2 | 3/2013 | Guhse et al. |
| 2018/0370241 A1 | 12/2018 | Koganehira |

FOREIGN PATENT DOCUMENTS

| | | | | |
|---|---|---|---|---|
| CN | 200610154033 A | | 9/2006 | |
| CN | 102371772 A | * | 3/2012 | .......... B41J 2/17509 |
| WO | WO-2014024458 A1 | | 2/2014 | |

* cited by examiner

*Primary Examiner* — Justin Seo
(74) *Attorney, Agent, or Firm* — HP Inc. Patent Department

(57) ABSTRACT

A printing device has a reservoir of colorant that is fillable from an external colorant supply temporarily connectable to the printing device. A selectable fill mode of the reservoir is enabled from a number of fill modes. The fill modes include a restricted fill mode in which the reservoir is filled from the external colorant supply responsive to determining that the external colorant supply can be emptied into the reservoir. The fill modes include an unrestricted fill mode in which the reservoir is filled from the external supply regardless of whether the external colorant supply can or cannot emptied into the reservoir. The printing device, responsive to temporary connection of the external colorant supply, controls filling of the reservoir from the external colorant supply in accordance with the selected fill mode.

15 Claims, 10 Drawing Sheets

SELECTABLE FILL MODE OF PRINTING DEVICE HAVING RESERVOIR FILLABLE FROM EXTERNAL COLORANT SUPPLY

BACKGROUND

Printing devices include multifunction peripherals (MFPs), multifunction devices (MFDs), and all-in-one (AIO) printing devices that combine printing functionality with other functionality, such as scanning, copying, and faxing functionality. Printing devices also include stand-alone printers that have just printing functionality. Printing devices can use a variety of different technologies, including laser-printing, inkjet-printing, and three-dimensional (3D) printing technologies. Printing devices print using colorant, such as toner, ink (which can include other printing fluids or material), and 3D printing material. The colorant is a consumable item, which means that the colorant has to be periodically replenished, to ensure that a printing device can continue to be used for printing.

DETAILED DESCRIPTION

Figure 1:
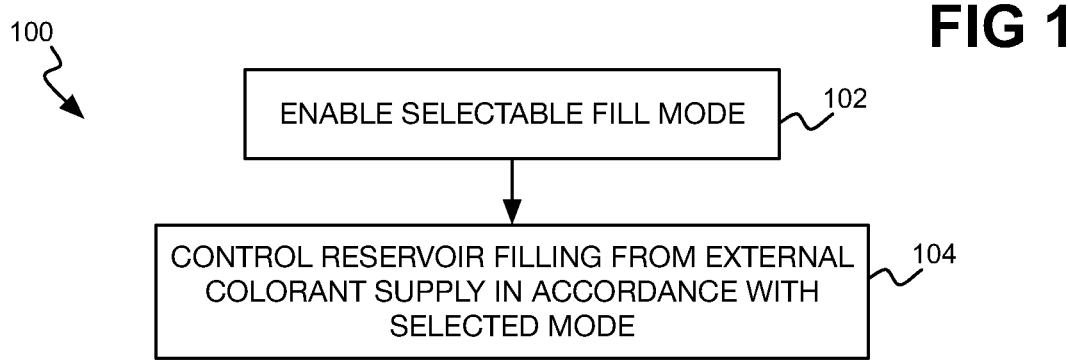
FIG. 1 is a flowchart of an example method for a printing device having a restricted fill mode and an unrestricted fill mode.

As noted in the background, printing devices print using colorant, like toner, ink, or three-dimensional (3D) printing material. Image-forming printing devices, such as laser-printing devices that use toner and inkjet-printing devices that use ink, form images on print targets, such as media like paper, by outputting colorant on the print targets. 3D printing devices using 3D printing material similarly form 3D structures by outputting colorant. Printing devices thus consume colorant as they are used, and the colorant has to be periodically replenished so that the devices can continue to be used.

Some types of printing devices employ replaceable colorant supplies, like toner or inkjet cartridges. Therefore, when a currently installed colorant supply of a printing device becomes empty of colorant, a user replaces the colorant supply with a replacement colorant supply. However, newer types of printing devices employ refillable colorant reservoirs. When a reservoir of a printing device runs low or becomes empty of colorant, a user may temporarily attach an external colorant supply to the printing device to refill the reservoir in question with more colorant.

An external colorant supply may have more colorant than the available capacity within a reservoir of a printing device. For example, a fresh external colorant supply may include 500 milliliters (ml) of ink. The reservoir of a printing device may have a maximum capacity of 1,000 ml, but there may already be 660 ml of ink in the reservoir, such that the reservoir has an available capacity of 340 ml. Therefore, there is more colorant in the external colorant supply (500 ml) than the available capacity within the reservoir (340 ml).

If an external colorant supply having more colorant than the available capacity within a reservoir of a printing device is nevertheless used to refill the reservoir to its maximum (or near-maximum) capacity—i.e., to "top off" the reservoir—there will still be colorant within the external colorant supply after refilling. Therefore, the external colorant supply can again be used for printing device reservoir refilling. Because a smaller amount of colorant remains within the external colorant supply, this remaining colorant may degrade more quickly than if the original, larger amount of colorant supply were still in the supply. This can mean that the next time the external colorant supply is used for reservoir refilling, the colorant quality may be sufficiently degraded to affect printing device performance, such as image quality.

Furthermore, users may not be familiar with the concept that external colorant supplies can still contain colorant after being used to refill the internal reservoirs of printing devices. That is, a user may have become used to the scenario in which, when a cartridge or other internal supply of colorant within a printing device becomes empty, the cartridge is swapped out for a replacement cartridge, with the original cartridge being empty and ready for recycling. The user may therefore forget that after an external colorant supply is used to refill a printing device that instead has an internal colorant reservoir, the supply may still include colorant that can be used for subsequent refilling of the reservoir. The user may thus recycle or otherwise discard the external colorant supply even though the supply could be used again.

This issue can be compounded by the fact that it may be difficult to discern whether an external colorant supply is empty or still contains some usable colorant from visual or other inspection of the supply itself. For example, moving an external colorant supply about in one's hand may not result in any readily discernible "sloshing" of colorant within the supply that may otherwise indicate that the supply still includes colorant. A user who does not know this may therefore still recycle or otherwise discard an external colorant supply even though the supply could be used again.

Techniques described herein ameliorate these and other issues. A printing device having a reservoir of colorant that is fillable from an external colorant supply temporarily connectable to the device includes a number of fill modes. In a restricted fill mode, filling of the reservoir from the external colorant supply is permitted just if the supply can be emptied into the reservoir. That is, after reservoir filling, usable colorant may not remain within the supply. As such, filling of the reservoir occurs responsive to determining that the supply can be emptied into the reservoir. The external colorant supply therefore cannot be used again, and is ready for recycling.

In an unrestricted fill mode, filling of the reservoir from the external colorant supply is permitted even if the supply is not completely emptied into the reservoir. That is, after reservoir filling, usable colorant remains within the supply. As such, filing of the reservoir occurs regardless of whether the supply can or cannot be emptied into the reservoir. The external colorant supply may be able to be used again for reservoir filling.

Printing devices may be operated in the restricted filling mode if there are any concerns associated with the potential for external colorant supplies still containing usable amounts of colorant after they are used the first time to refill reservoirs. For example, if printing device usage is sufficiently low that an external colorant supply may sit for extended lengths of time after being used for reservoir filling, then operating the printing device in the restricted filling mode can ensure that colorant quality of the external colorant supply does not degrade unnecessarily quickly. As another example, if it is expected that external colorant supplies may be improperly discarded or otherwise recycled after they are used the first time to refill printing device reservoirs, or misplaced or lost after they are used the first time, then operating printing devices in the restricted fill mode can ensure that colorant is not unnecessarily wasted.

However, printing devices may still be operated in the unrestricted filling mode for maximum flexibility in refilling their reservoirs. For example, service personnel may refill the reservoirs of the printing devices on a set schedule, topping off the reservoirs with colorant regardless of whether they are currently low or empty. Such regular top offs decrease the likelihood that any reservoir will become empty between regularly scheduled refills. Furthermore, dedicated service personnel are more likely to understand that external colorant supplies can still include usable amounts of colorant even after they are used the first time to refill printing device reservoirs, and therefore will be less likely to misplace or prematurely recycle the supplies afterwards.

FIG. 1 shows an example method 100. A printing device having a reservoir of colorant refillable via temporary connection of an external colorant supply to the device can perform the method 100. The method 100 may be implemented as program code stored on a non-transitory computer-readable data storage medium. The program code may thus be executable by the printing device to perform the method 100.

The printing device enables a selectable fill mode from a number of fill modes (102). For example, the printing device can permit a user to select a fill mode from the number of fill modes. The user may select the fill mode by interacting with a user interface provided at the printing device itself. For example, the printing device may include a display or another output device like discrete indicator lights such as light-emitting diodes (LEDs). The printing device may include a touchscreen integrated within the device's display, or another output device such as hard controls like buttons or a keyboard. The user thus interacts with the input device of the printing device to select a desired fill mode from a number of available fill modes, as indicated on the printing device's output device.

The printing device may permit the user to select a fill mode in another way as well. For example, the printing device may be communicatively connected to a network, and therefore may be able to be configured via a computing device, like a desktop or laptop computer, a smartphone, or a tablet computing device, in communication with the printing device. As another example, a storage device like a flash drive that stores a configuration file in which the fill mode is specified may be connected to the printing device.

As a third example, the external colorant supply may itself have a memory that specifies the fill mode in conjunction with which the supply is used. If the memory is read-only or the memory is write-protected or the specified fill mode is otherwise not able to be changed within the memory, then the fill mode is effectively selected based on the particular supply that is used to refill the reservoir. As such, if a different fill mode is desired, then a different supply has to be used to refill the reservoir. By comparison, if the memory is not read-only and the specified fill mode is able to be changed within the memory, then the specified fill mode may be considered a default fill mode for the supply. A different fill mode may be able to be selected as in the previous paragraph and subsequently written to the memory.

The fill modes from which the user can select a desired fill mode can include a restricted fill mode. As noted above, in the restricted fill mode, when an external colorant supply is temporarily connected to the printing device, the reservoir of the printing device is refilled just if the external colorant supply can be emptied into the reservoir. If refilling the reservoir would instead result in usable colorant remaining within the external colorant supply, then refilling of the reservoir from the external colorant supply does not occur in the restricted fill mode.

The fill modes from which the user can select a desired fill mode can include an unrestricted fill mode. As noted above, in the unrestricted fill mode, when an external colorant supply is temporarily connected to the printing device, the reservoir of the printing device is refilled even if the external colorant supply cannot be emptied into the reservoir. If refilling the reservoir would result in usable colorant remaining within the external colorant supply, in other words, refilling of the reservoir from the external colorant supply still occurs in the unrestricted fill mode.

The fill modes can include other fill modes as well, in addition to and/or in lieu of the restricted and/or unrestricted fill modes. Once the user has selected a fill mode, the printing device controls filling of the reservoir from an external colorant supply temporarily connected to the printing device in accordance with the selected mode (104). If the restricted fill mode has been selected, then when an external colorant supply is temporarily connected, the printing device refills the reservoir just if the supply can be emptied into the reservoir. If the unrestricted fill mode has been selected, then when an external colorant supply is temporarily connected, the printing device refills the reservoir (i.e., "tops off" the reservoir so that its maximum capacity is filled with colorant) regardless of whether the supply is emptied into the reservoir.

Figure 2:
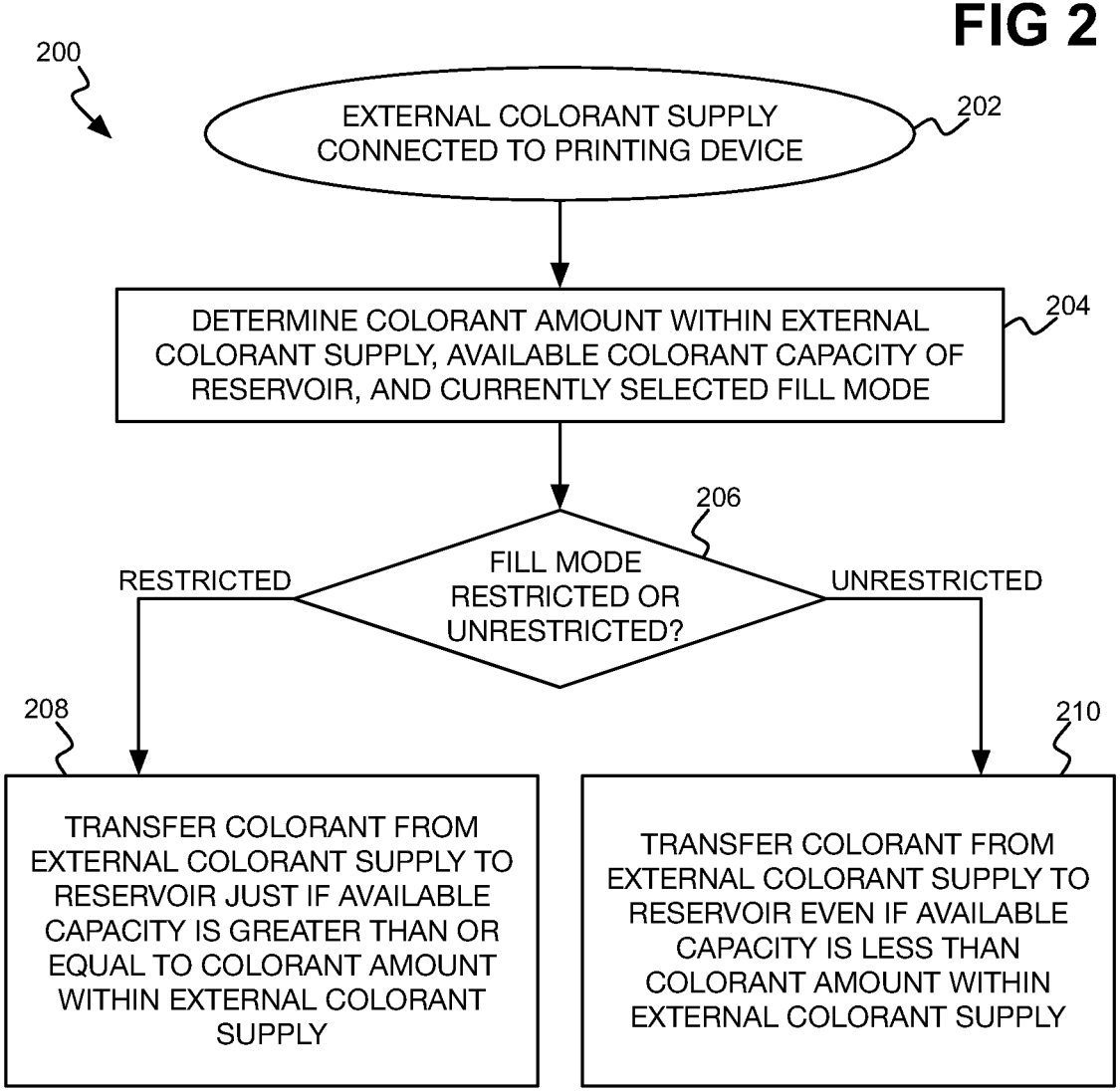
FIG. 2 is a flowchart of an example method for a printing device having a restricted fill mode and an unrestricted fill mode.

FIG. 2 shows another example method 200, which can be used in conjunction with the method 100. Like the method 100, the method 200 can be performed by a printing device having a reservoir of colorant refillable via a temporarily connected external colorant supply. The method 200 can likewise also be implemented as program code stored on a non-transitory computer-readable data storage medium, and executable by the printing device.

An external colorant supply is connected to the printing device (202). In response, the printing device determines the colorant amount within the external colorant supply, the available colorant capacity of the printing device's reservoir, and the currently selected fill mode of the printing device (204). The printing device may determine the colorant amount within the external colorant supply by reading data from a memory of the external colorant supply indicating the amount of colorant within the supply. The external colorant supply in another implementation may include a sensor that detects the amount of colorant within the supply and communicates this information to the printing device.

The printing device may determine the available colorant supply of the reservoir of the device using a sensor that detects the amount of colorant currently within the reservoir. The printing device may subtract the detected colorant amount from the maximum capacity of the reservoir, which may be known ahead of time and which may otherwise be fixed. The printing device may determine the currently selected fill mode by reading a memory of the device that stores this information and that is updated when a different fill mode is selected. The memory may store a default fill mode that is considered as preselected if a user does not change fill mode to a different mode.

If the selected fill mode is the restricted fill mode (206), then the printing device transfers colorant from the external colorant supply to the reservoir just if the reservoir's available colorant capacity is greater than or equal to the colorant amount within the external colorant supply (208). As such, if the available colorant capacity of the reservoir is less than the amount of colorant within the external colorant supply, then the printing device does not transfer colorant from the supply to the reservoir. Therefore, if filling of the reservoir does occur, then afterwards the external colorant supply is empty.

An external colorant supply is empty when the supply contains no further colorant that can be transferred from the supply to the reservoir during the process of the reservoir. Some colorant may thus in fact remain within the external colorant supply when the supply is empty, but such colorant cannot be usably transferred from the supply to the reservoir in the course of refilling the reservoir. For example, there may be at least a trace amount of colorant remaining within the external colorant supply when the supply becomes empty. As another example, there may be an amount of colorant remaining within the external colorant supply that could be extracted from the supply if the supply were opened. However, this colorant is not transferrable from the supply during the normal course of refilling the reservoir, such as when the printing device uses a pump to transfer the colorant to the reservoir. Therefore, the external colorant supply is still considered empty in this case. To the extent that any colorant remains within the supply, the colorant is not usable for reservoir refilling.

If the selected fill mode is the unrestricted fill mode (206), then the printing device transfers colorant from the colorant supply to the reservoir even if the reservoir's available colorant capacity is less than the colorant amount within the external colorant supply (210). In some cases, then, colorant may remain in the external colorant supply after filling of the reservoir, such that the external colorant supply can again be used for reservoir filling. In other cases, however, no colorant may remain in the external colorant supply after filling, such that the supply is empty.

Figure 3:
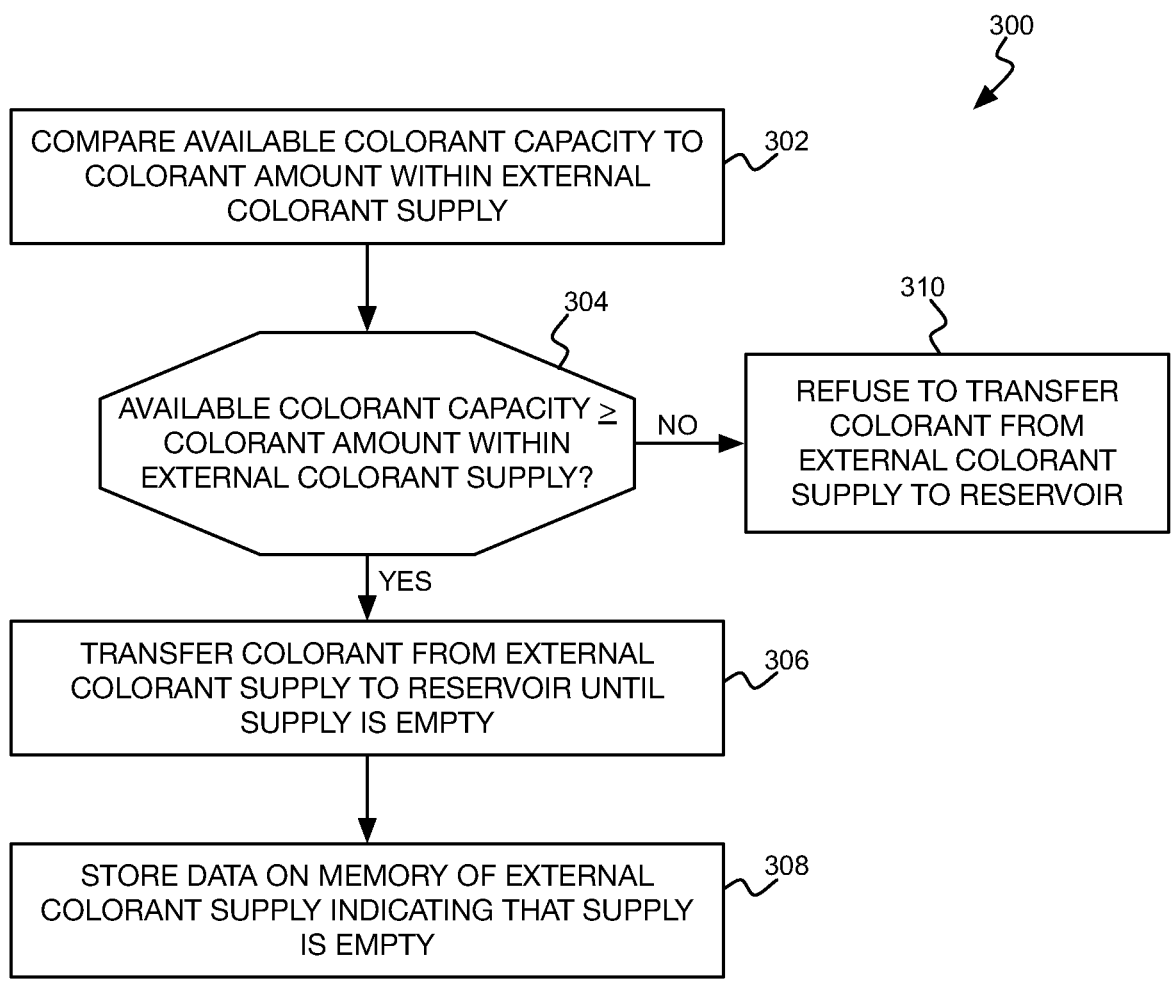
FIG. 3 is a flowchart of an example method for a printing device operating in a restricted fill mode.

FIG. 3 shows an example method 300 for operating a printing device in a restricted fill mode when an external colorant supply is connected to the device for filling a reservoir of the printing device. The method 300 can implement part 208 of the method 200, for instance. The method 300 can, like the methods 100 and 200, also be performed by the printing device, and be implemented as program code stored on a non-transitory computer-readable data storage medium and executable by the printing device.

The printing device compares the available colorant capacity within the reservoir of the printing device to the amount of colorant within the external colorant supply (302). If the reservoir's available colorant capacity is greater than or equal to the colorant amount within the external colorant supply (304), then the printing device transfers the colorant from the external colorant supply to the reservoir until the supply is empty (306). As one example, if the printing device has a sensor that can detect the amount of colorant within the reservoir, then the device may transfer colorant from the external colorant supply to fill the reservoir until the amount of colorant within the reservoir is equal to the sum of the colorant amount within the reservoir prior to transfer and the colorant amount within the external colorant supply prior to transfer.

After transfer of the colorant from the external colorant supply to the reservoir of the printing device is complete, the printing device may store data on a memory of the external colorant supply indicating that the colorant supply is now empty (308). For example, the printing device may store data on the memory indicating that the amount of usable colorant remaining within the external colorant supply is zero. Because the external colorant supply does not have any remaining usable colorant, the supply can thus be recycled or otherwise discarded without wasting any colorant.

If, however, the reservoir's available colorant capacity is less than the colorant amount within the external colorant supply (304), then the printing device refuses to transfer colorant from the external colorant supply to the reservoir (310). The printing device does not transfer colorant from the external colorant supply to the reservoir of the printing device. The external colorant supply therefore still has an amount of usable colorant—i.e., the colorant amount the supply had when connected to the printing device—and may be later connected to the same or different printing device for reservoir filling.

Figure 4:
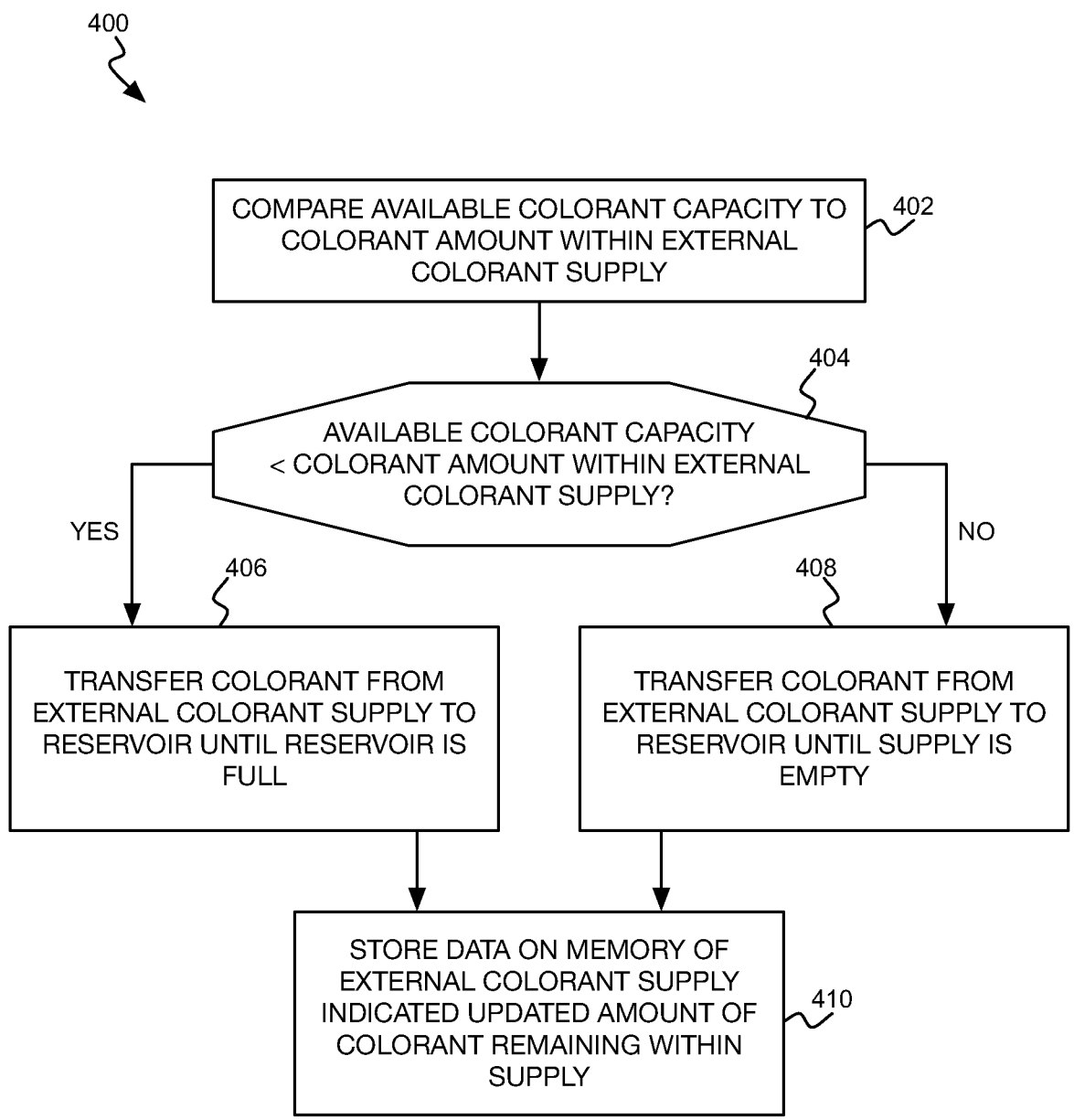
FIG. 4 is a flowchart of an example method for a printing device operating in an unrestricted fill mode.

FIG. 4 shows an example method 400 for operating a printing device in an unrestricted fill mode when an external colorant supply is connected to the device for filling a reservoir of the printing device. The method 400 can implement part 210 of the method 200 of FIG. 2, for instance. The method 400, like the methods 100, 200, and 300 of FIGS. 1, 2, and 3, can also be performed by the printing device and implemented as program code stored on a non-transitory computer-readable data storage medium and executable by the printing device.

The printing device compares the available colorant capacity to the colorant amount within the external colorant supply (402). If the reservoir's available colorant capacity is less than the amount of colorant within the external colorant supply (404), then the printing device transfers colorant from the external colorant supply to the reservoir until the reservoir is full (406). For example, if the printing device has a sensor that can detect the amount of colorant within the reservoir, then the device may transfer colorant from the external colorant supply to fill the reservoir until the amount of colorant within the reservoir is equal to its maximum capacity.

If the reservoir's available colorant is greater than or equal to the amount of colorant within the external colorant supply (404), however, then the printing device transfers colorant from the external colorant supply to the reservoir until the supply is empty (408). As in part 306 of FIG. 3, as one example, if the printing device has a sensor that can detect the amount of colorant within the reservoir, then the device may transfer colorant from the external colorant supply to fill the reservoir until the amount of colorant within the reservoir is equal to the sum of the colorant amount within the reservoir prior to transfer and the colorant amount within the external colorant supply prior to transfer. In the method 400, then, the printing device transfers colorant from the external colorant supply to the reservoir regardless of the available colorant capacity within the reservoir as compared to the amount of colorant within the external colorant supply.

After transfer of the colorant from the external colorant supply to the reservoir of the printing device is complete, the printing device may store data on a memory of the external colorant supply indicating the updated amount of colorant remaining within the supply (410). If part 406 was performed, then the updated amount of colorant remaining within the external colorant supply is greater than zero, and is equal to the amount of colorant that was within the supply prior to transfer minus the amount of colorant transferred from the supply to the reservoir. If the colorant was transferred from the supply to the reservoir until the reservoir became full, then the updated amount of colorant remaining within the supply is equal to the amount of colorant within the supply prior to transfer minus the available capacity of the reservoir prior to transfer. This is because, in this case, the amount of colorant transferred from the supply to the reservoir is equal to the available capacity of the reservoir prior to transfer. If part 408 was performed, by comparison, then the updated amount of colorant remaining within the external colorant supply is zero, such that the data stored on the memory indicates that the supply is now empty.

Figure 5:
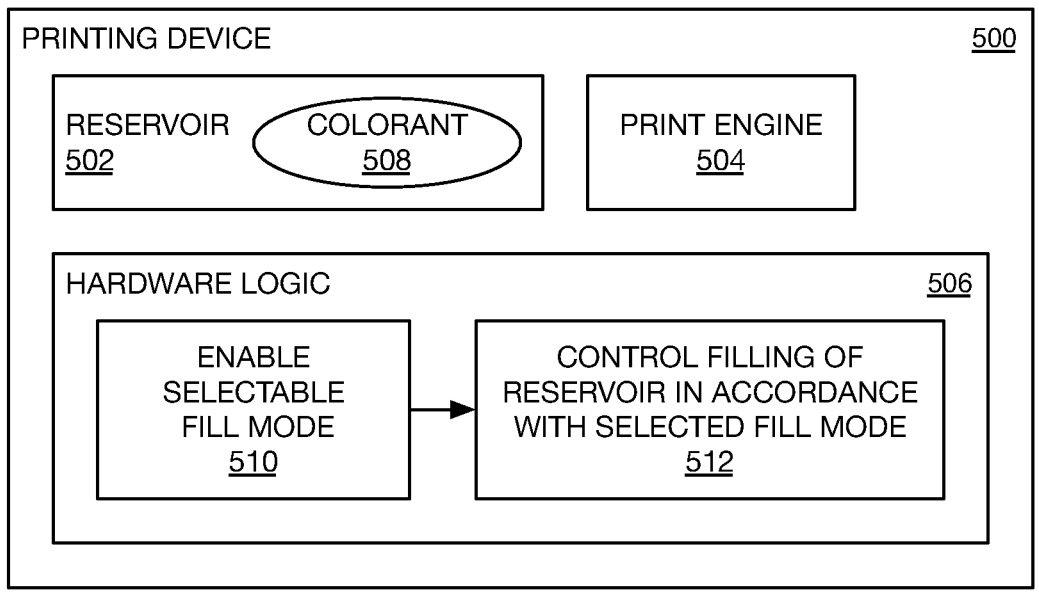
FIG. 5 is a block diagram of an example printing device that includes a fillable colorant reservoir.

FIG. 5 shows an example printing device 500 that can perform the methods that have been described. The printing device 500 may be a standalone printer, or a multifunction peripheral (MFP), a multifunction device (MFD) or all-in-one (AIO) device. The printing device 500 can include other components, in addition to or in lieu of those depicted in FIG. 5.

The printing device 500 includes one or more reservoirs 502 that can each store colorant 508. If the printing device 500 is a monochromatic printing device, then there may just be one reservoir 502 storing colorant 508 of one color, such as black. If the printing device 500 is a color printing device, then there may be more than one reservoir 502 that each store colorant 508 of a different color. For example, if the printing device 500 is a full-color printing device, then there may be four reservoirs 502 that respectively store cyan, magenta, yellow, and black colorant 508.

The printing device 500 includes a print engine 504 that prints using the colorant 508 from the reservoirs 502. The print engine 504 may be an image-forming print engine that forms images by outputting colorant onto print targets, including media like paper. The print engine 504 may thus be an inkjet-printing engine that uses ink as the colorant 508, or a laser-printing engine that uses toner as the colorant 508 in different implementations. The print engine 504 may instead be a 3D-printing engine that forms 3D structures by outputting colorant, in which case the colorant 508 is 3D printing material.

The printing device 500 includes hardware logic 506. The hardware logic 506 can be an application-specific integrated circuit (ASIC) encoded with program code, or a more general-purpose processor that executes program code from a memory or other storage device that is also considered part of the logic 506. In either case, the hardware logic 506 can be considered a non-transitory computer-readable data storage medium that stores program code that the printing device 500 executes.

The hardware logic 506 can perform the methods that have been described. For instance, the hardware logic 506 can enable a selectable fill mode from a number of fill modes (510). For example, the hardware logic 506 can permit a user to select a fill mode from the number of fill modes. The hardware logic 506 can then, responsive to an external colorant supply being connected to the printing device 500, control filling of the reservoir 502 corresponding to the external colorant supply in accordance with the selected fill mode (512).

Figure 6:
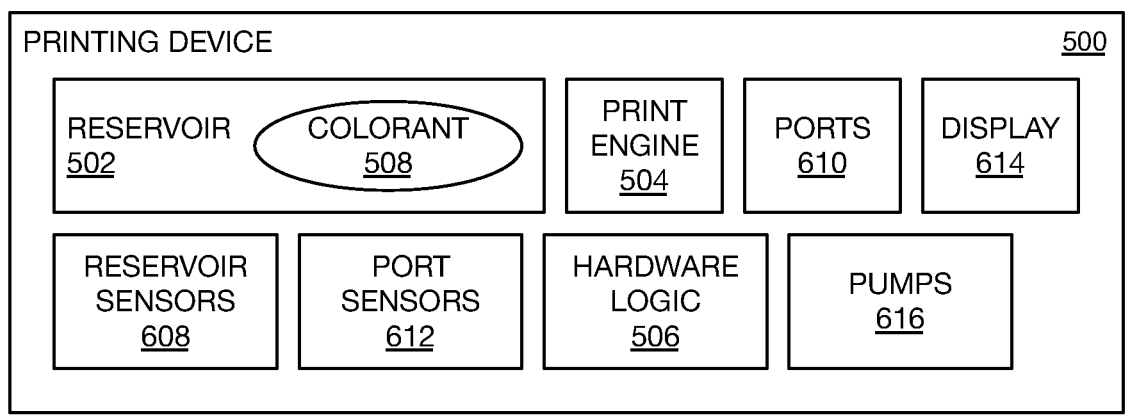
FIGS. 6 and 7 are respectively a block diagram and a perspective diagram of an example printing device that includes a fillable colorant reservoir and which is more detailed than but consistent with FIG. 5.
Figure 7:
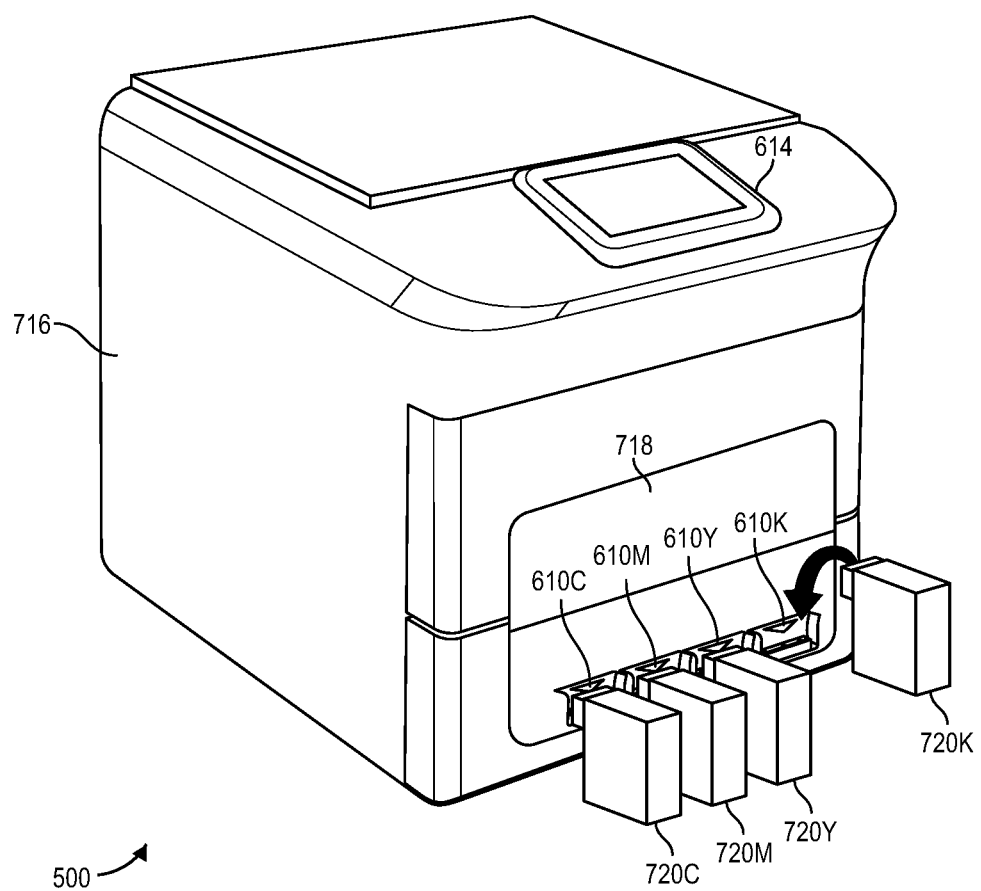

FIGS. 6 and 7 respectively show a block diagram and a perspective diagram of an implementation of the example printing device 500 in more detail. In the examples of FIGS. 6 and 7, the printing device 500 still includes one or more reservoirs 502 that store colorant 508, a print engine 504, and hardware logic 506. However, the printing device 500 of FIGS. 6 and 7 can also include one or more reservoir sensors 608 for the one or more reservoirs 502, one or more ports 610 and one or more port sensors 612 respectively corresponding to the one or more reservoirs 502, and one or more pumps 616 for the one or more reservoirs 502, as well as a display 614.

In the specific example of FIG. 7, the printing device 500 includes a housing 716 in which the display 614 and an openable door 718 that reveals the ports 610 are disposed. In the specific example of FIG. 7, there are four ports 610C, 610M, 610Y, 610K corresponding and respectively fluidically connected to four reservoirs 502 of FIG. 6. The four reservoirs 502 respectively store cyan, magenta, yellow, and black colorant 508. FIG. 7 depicts external colorant supplies 720C, 720M, 720Y, and 720K respectively containing cyan, magenta, yellow, and black colorant, and which can be connected to corresponding ports 610C, 610C, 610M, and 610K of the printing device 700. For illustration purposes, FIG. 7 shows the colorant supplies 720C, 720M, and 720Y currently temporarily connected to the corresponding ports 610C, 610M, and 610Y, and shows how the colorant supply 720K can be temporarily connected to the corresponding port 610K. The external colorant supplies 720C, 720M, 720Y, and 720K are collectively referred to as the external colorant supplies 720.

Each reservoir sensor 608 of the example printing device 500 in the implementation of FIGS. 6 and 7 can detect the colorant current level, and thus the current amount of colorant 508, within a corresponding reservoir 502. Each port 610 is fluidically coupled to a corresponding reservoir 502. Each port sensor 612 can detect the temporary connection of an external colorant supply to a corresponding port 610. Each pump 616 can, under control by the hardware logic 506, pump colorant to a corresponding reservoir 502 from an external colorant supply temporarily connected to the port 610 fluidically coupled to the reservoir 502 in question. The display 614 may be a liquid-crystal display (LCD) or another type of flat-panel display (FPD) or other display. The display 614 can be a touchscreen display, and thus also function as an input device of the printing device 500.

Figure 8A:
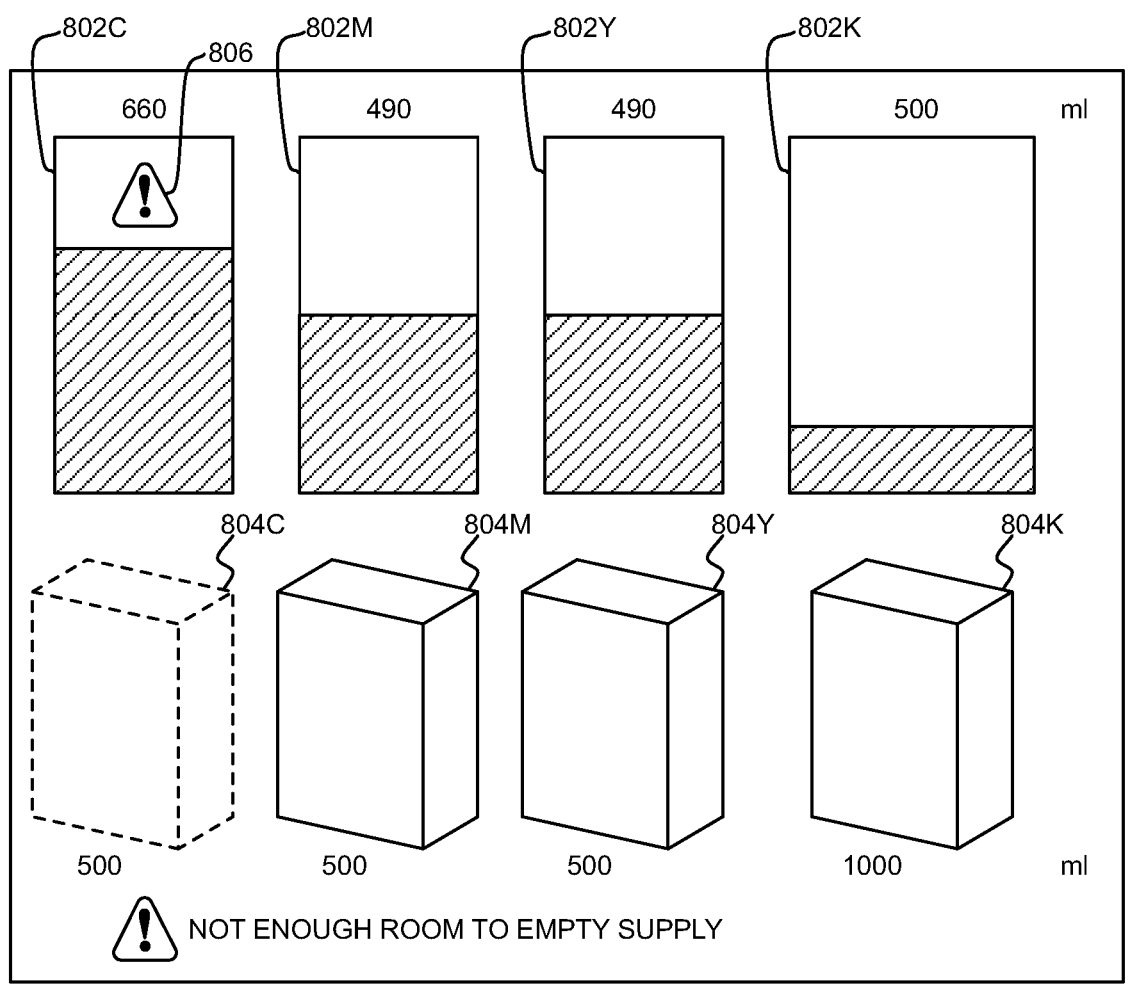
FIGS. 8A and 8B are diagrams of an example display of a printing device when the device is operating in a restricted fill mode.
Figure 8B:
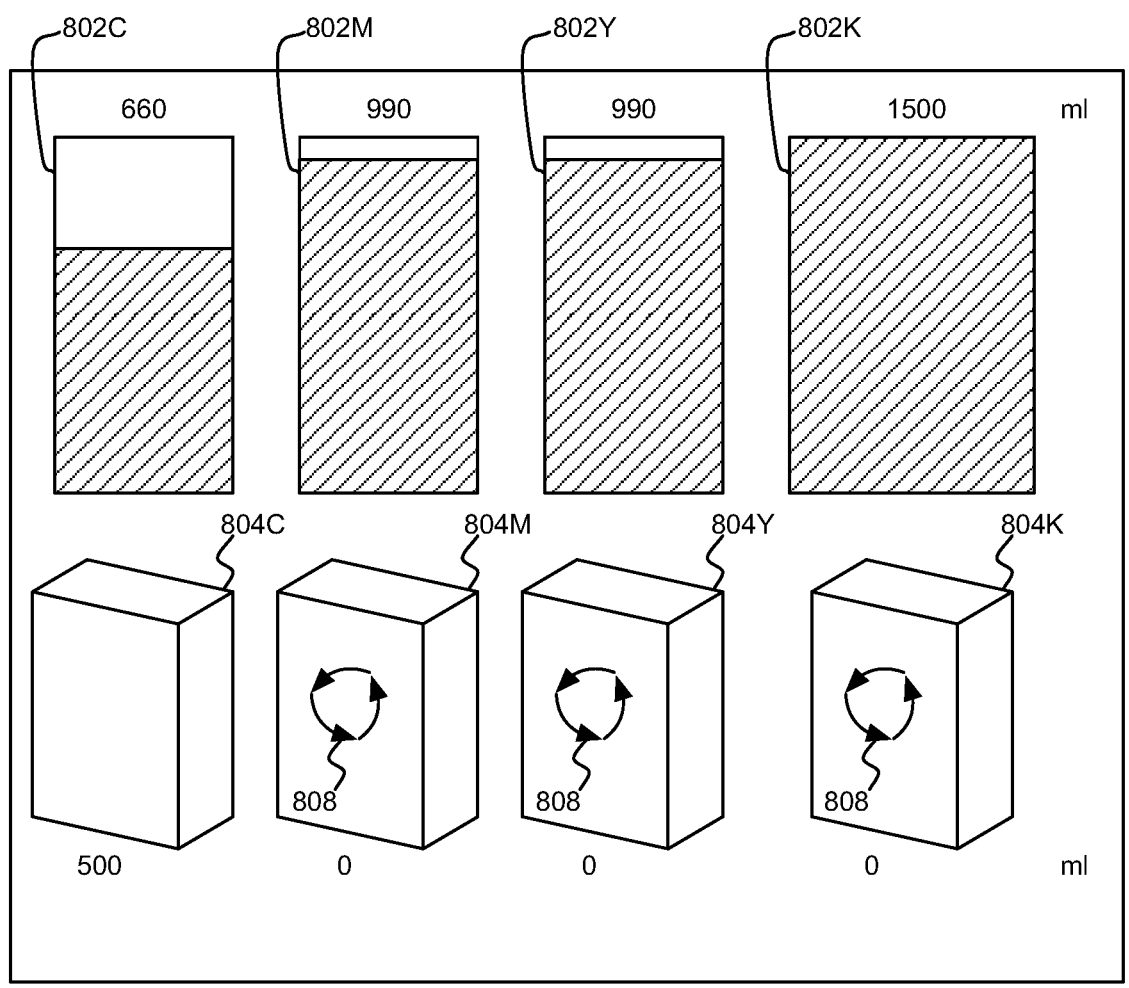

FIGS. 8A and 8B show the example display 614 of the printing device 500 when the device 500 is operating in the restricted fill mode. Specific examples of icons and symbols are shown in FIGS. 8A and 8B, but other icons and symbols can be used as well. In FIG. 8A, the external colorant supplies 720 have been connected to corresponding ports 610 of the printing device 500. However, the printing device 500 has not yet initiated colorant transfer from any colorant supply 720 to the reservoir 502 to which the supply 720 is fluidically coupled.

The printing device 500 displays current supply levels 802C, 802M, 802Y, and 802K of the cyan, magenta, yellow, and black colorant 508 within respective reservoirs 502 of the device 500. The supply levels 802 are collectively referred to as the supply levels 802. In the example of FIG.

8A, each current supply level 802 is specified as a volumetric amount of the remaining colorant 508 within a corresponding reservoir 502, expressed in milliliters (ml). The supply levels 802C, 802M, 802Y, and 802K in the example of FIG. 8A are 660 ml, 490 ml, 490 ml, and 500 ml, respectively.

The printing device 500 also displays external colorant supply icons 804C, 804M, 804Y, and 804K, collectively referred to as the icons 804 and respectively corresponding to the external colorant supplies 720. The printing device 500 displays each icon 804 below the supply level 802 of the reservoir 502 to which the corresponding external colorant supply 720 is fluidically coupled. The printing device 500 displays below each icon 804 the colorant amount within the corresponding external colorant supply 720. In the example of FIG. 8A, the external colorant supplies 720 include colorant amounts of 500 ml, 500 ml, 500 ml, and 1,000 ml, respectively.

The maximum capacity of each of the reservoirs 502 having the cyan, magenta, and yellow colorant 508 with supply levels 802C, 802M, and 802Y is 1,000 ml, whereas the maximum capacity of the reservoir 502 having the black colorant 508 with supply level 802K is 1,500 ml. Therefore, there is sufficient available capacity within the reservoirs 502 having the magenta, yellow, and black colorant 508 to receive all the colorant within their respective external colorant supplies 720M, 720Y, and 720K. Specifically, each of the reservoirs 502 for the magenta and yellow colorant 508 has an available capacity of 1,000−490=510 ml, whereas the colorant amount of each of the magenta and yellow external colorant supplies 720M and 720Y is 500 ml. Similarly, the reservoir 502 for the black colorant 508 has an available capacity of 1,500−500=1,000 ml, and the colorant amount of the black external colorant supply 720K is also 1,000 ml. Therefore, the external colorant supplies 720M, 720Y, and 720K can be completely emptied into their respective reservoirs 502.

By comparison, there is insufficient available capacity within the reservoir having the cyan colorant 508 to receive all the colorant within the external colorant supply 720C. The reservoir 502 for the cyan colorant 508 has an available capacity of 1,000−660=340 ml, whereas the colorant amount of the cyan external colorant supply 720C is 500 ml. The printing device 500 therefore will not transfer any colorant from the cyan external colorant supply 720C to this reservoir 502. As shown in FIG. 8A, the printing device 500 can display a symbol 806, such as an exclamation point, on the supply level 802C for this reservoir 502, and display the icon 804C for the cyan external colorant supply 720C with dotted lines, to accordingly alert the user.

In FIG. 8B, the printing device 500 has completed colorant transfer from the magenta, yellow, and black external colorant supplies 720M, 720Y, and 720K. The printing device 500 again displays the current supply levels 802 of the cyan, magenta, yellow, and black colorant 508 within respective reservoirs 502 of the device 500. The supply level 802C of the cyan colorant 508 remains the same as before, at 660 ml, because no colorant was transferred from the cyan external colorant supply 720C. By comparison, the supply levels 802M and 802Y of the magenta and yellow colorant 508 are each 990 ml, reflecting that the magenta and yellow colorant supplies 720M and 720Y have had their colorant completely transferred to the respective reservoirs 502. Similarly, the supply level 802K is 1,500 ml, which reflects that colorant has been completely transferred from the black colorant supply 720K.

The printing device 500 also again displays the icons 804 corresponding to the external colorant supplies 720, along with the colorant amount remaining within each colorant supply 720 after transfer. Because no colorant has been transferred from the external colorant supply 720C, the colorant amount displayed under the icon 804C remains the same at 500 ml. Because all the colorant has been transferred from the external colorant supplies 720M, 720Y, and 720K, the colorant amounts displayed under the icons 804M, 804Y, and 804K are now each 0 ml. As shown in FIG. 8B, the printing device 500 can accordingly display recycling or other symbols 808 on the icons 804M, 804Y, and 804K, to alert the user that that the colorant supplies 720M, 720Y, and 720K are now empty (and thus ready for recycling).

Figure 9A:
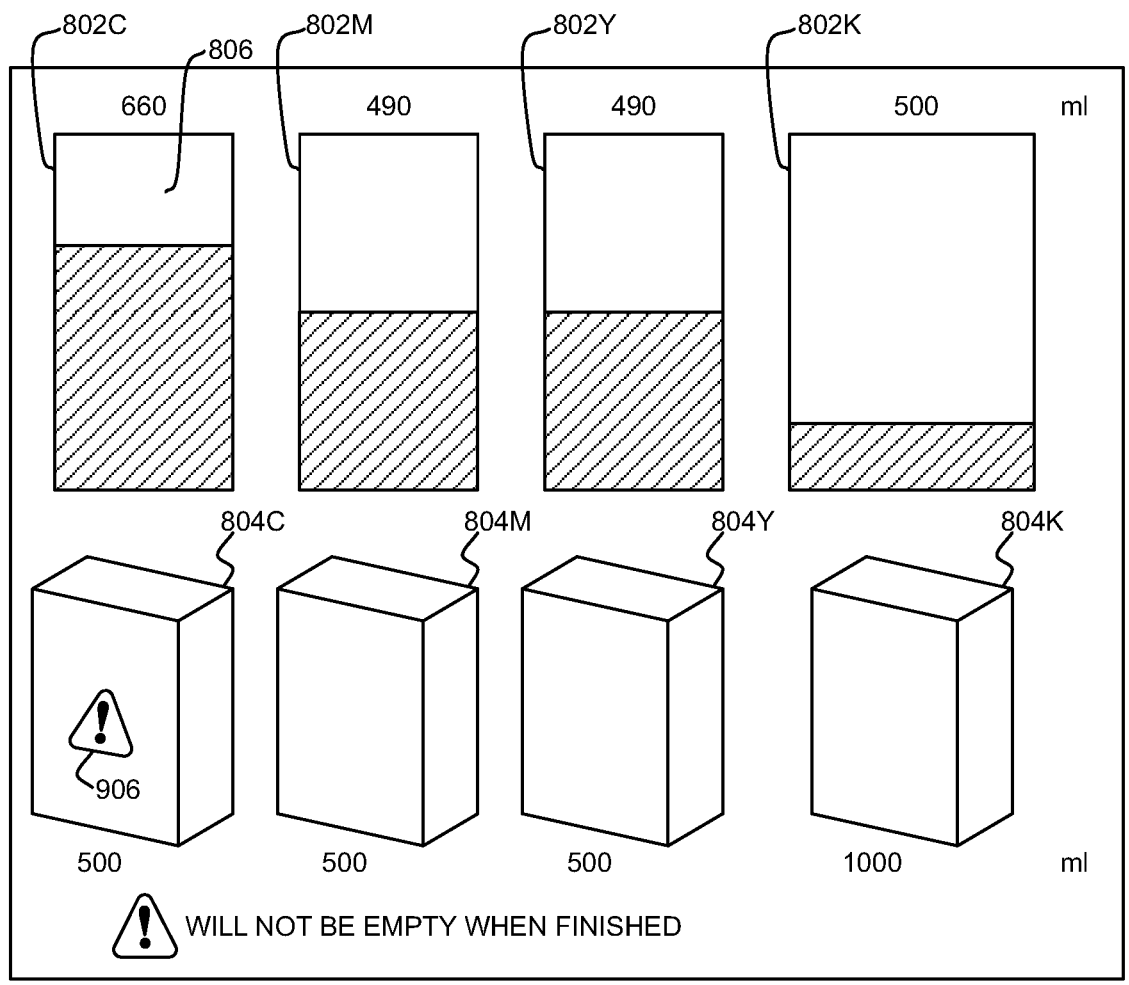
FIGS. 9A and 9B are diagrams of an example display of a printing device when the device is operating in an unrestricted fill mode.
Figure 9B:
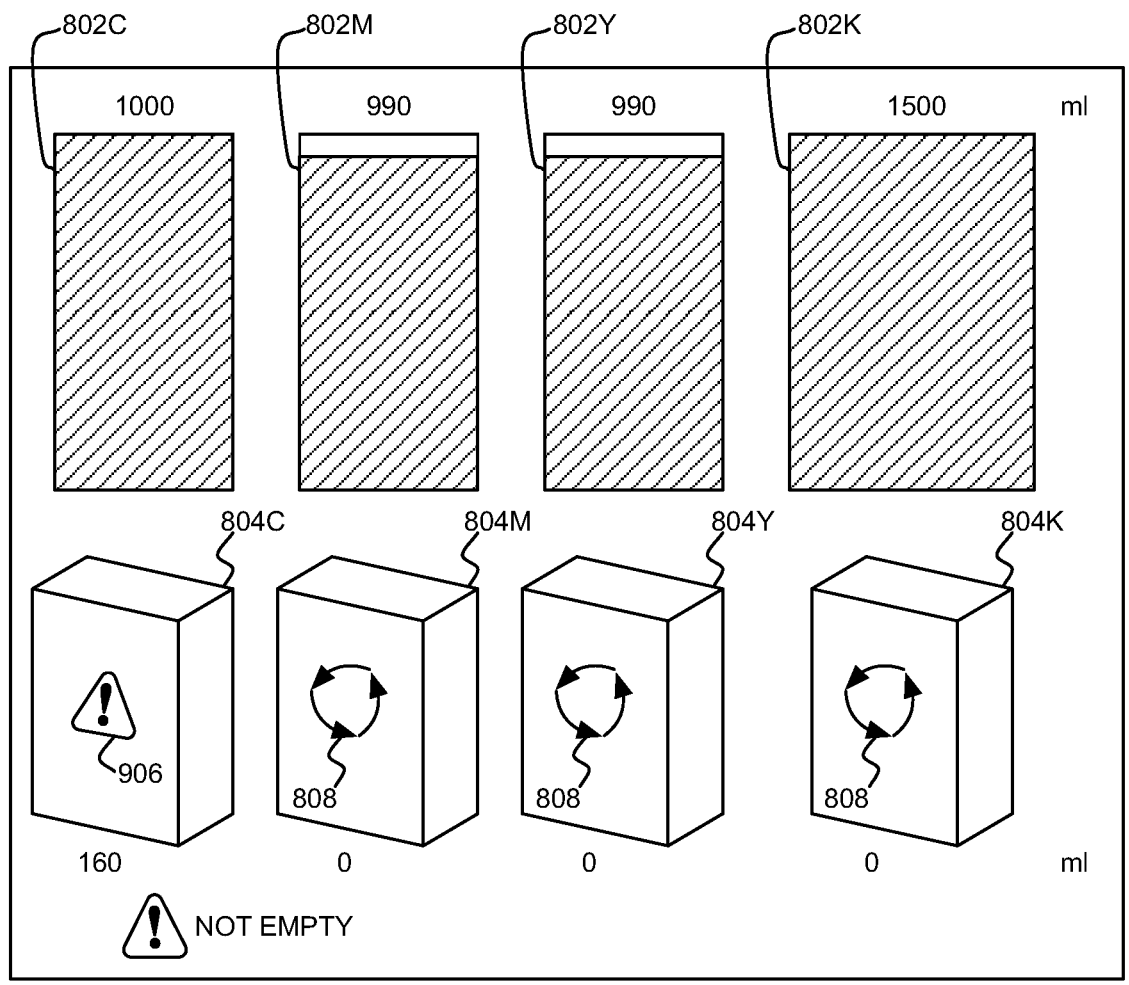

FIGS. 9A and 9B show the example display 614 of the printing device 500 when the device 500 is operating in the unrestricted fill mode. As in FIGS. 8A and 8B, specific examples of icons and symbols are shown in FIGS. 9A and 9B, but other icons and symbols can be used as well. In FIG. 9A, the external colorant supplies 720 have been connected to corresponding ports 610 of the printing device 500. However, the printing device 500 has not yet initiated colorant transfer from any colorant supply 720 to the reservoir 502 to which the supply 720 is fluidically coupled.

As in FIG. 8A, in FIG. 9A the printing device 500 displays current supply levels 802 of the cyan, magenta, yellow, and black colorant 508 within respective reservoirs 502 of the device 500, and these supply levels 802 are again 660 ml, 490 ml, 490 ml, and 500 ml, respectively. Also as in FIG. 8A, in FIG. 9A the printing device 500 displays external colorant supply icons 804 corresponding to the external colorant supplies 720, as well as the initial colorant amounts within the supplies 720. These colorant amounts are again 500 ml, 500 ml, 500 ml, and 1,000 ml, respectively.

As in FIG. 8A, the external colorant supplies 720M, 720Y, and 720K can be completely emptied into their respective reservoirs 502 in FIG. 9A, whereas the reservoir 502 having the cyan colorant 508 has insufficient available capacity to receive all the colorant within the external colorant supply 720C. However, because the printing device 500 is operating in the unrestricted fill mode in FIG. 9A, transfer from the external colorant supply 720C will still occur. The printing device 500 can display a symbol 906, such as an exclamation point, on the icon 804C to indicate that after transfer occurs, there will still be usable colorant remaining in the external colorant supply 720C (i.e., the supply 720C will not be empty).

In FIG. 9B, the printing device 500 has completed colorant transfer from each of the colorant supplies 720. The printing device 500 again displays the current supply levels 802 of the cyan, magenta, yellow, and black colorant 508 within respective reservoirs 502 of the device 500. As in FIG. 8B, in FIG. 9B the supply levels 802M, 802Y, and 802K are 990 ml, 990 ml, and 1,500 ml, respectively, reflecting that the external colorant supplies 720M, 720Y, and 720K have been emptied into their respective reservoirs 502. The supply level 802C is 1,000 ml, reflecting that colorant has been transferred from the external colorant supply 720C until its respective reservoir 502 has become full.

The printing device 500 also again displays the icons 804 corresponding to the external colorant supplies 720, along with the colorant amount remaining within each colorant supply 720 after transfer. As in FIG. 8B, in FIG. 9B the colorant amounts displayed under the icons 804M, 804Y, and 804K are now each 0 ml, because all the colorant has been transferred from the external colorant supplies 720M, 720Y, and 720K. Also as in FIG. 8B, in FIG. 9B the printing device 500 can accordingly display recycling or other symbols 808 on the icons 804M, 804Y, and 804K, to alert the user that the colorant supplies 720M, 720Y, and 720K are now empty (and thus ready for recycling).

However, the colorant amount displayed under the icon 804C remains non-zero. Specifically, the colorant amount display under the icon 804C is now 160 ml, because just 340 ml was transferred from the external colorant supply 720C until the respective reservoir 502 became full. The printing device 500 can continue to display the symbol 906 on the icon 804C to alert the user that the external colorant supply 720C is not empty and still contains usable colorant.

Figure 10:
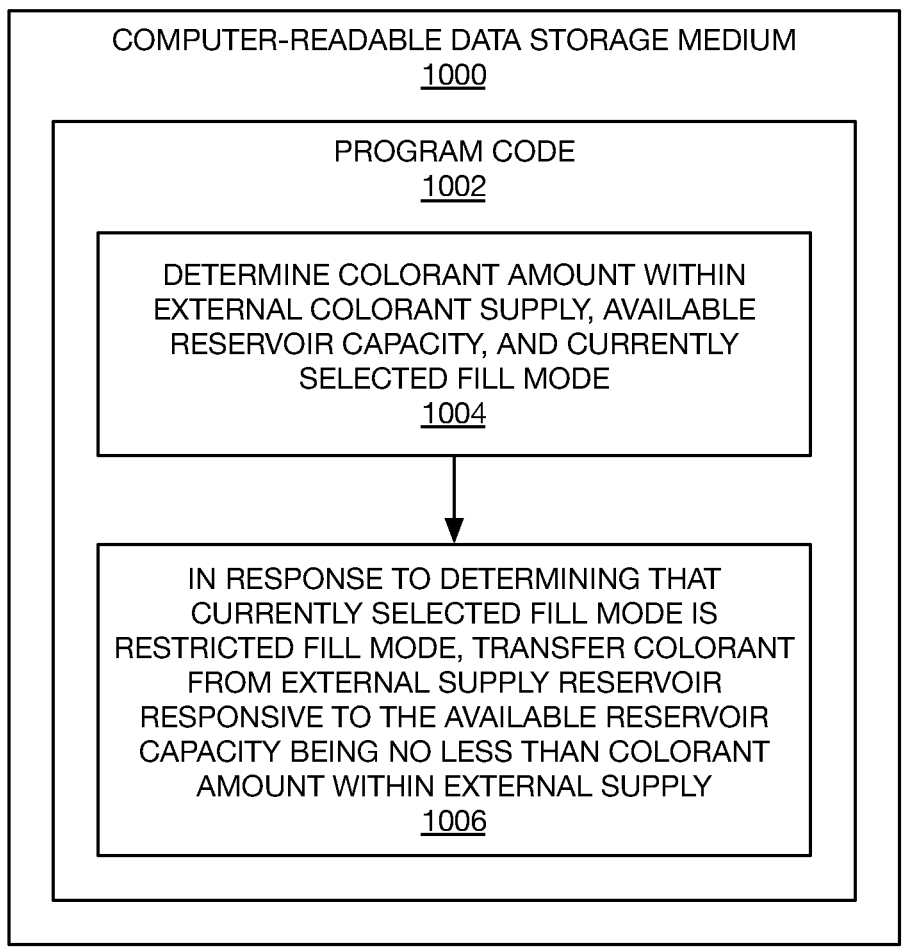
FIG. 10 is a diagram of an example non-transitory computer-readable data storage medium.

FIG. 10 shows an example non-transitory computer-readable data storage medium 1000. The computer-readable data storage medium 1000 stores program code 1002 that a printing device, such as the printing device 500, can execute to perform processing. The processing can include, responsive to temporary connection of an external colorant supply to the printing device, determining the colorant amount within the external colorant supply, the available colorant capacity of the reservoir to which the external colorant supply is fluidically coupled, and the currently selected fill mode of the printing device (1004). The processing can further include, in response to determining that the currently selected fill mode is the restricted fill mode, transferring colorant from the external colorant supply to the reservoir responsive to the available capacity being no less than the colorant amount within the external colorant supply (1006). That is, colorant is transferred just if the available capacity within the reservoir is no less than the colorant amount within the external colorant supply.

Techniques have been described herein for operating a printing device having a refillable internal reservoir in one of at least two fill modes, including a restricted fill mode and an unrestricted fill mode. The printing device can be operated in the restricted fill mode if an external colorant supply should become empty when used to refill the reservoir. By comparison, the printing device can be operated in the unrestricted fill mode to a "top off" the reservoir from an external colorant supply, regardless of whether usable colorant will afterwards remain in the external colorant supply.

We claim:

1. A method comprising:
enabling, by a printing device having a reservoir of colorant that is fillable from an external colorant supply temporarily connectable to the printing device, a selectable fill mode of the reservoir from a plurality of fill modes comprising:
a restricted fill mode in which the reservoir is filled from the external colorant supply responsive to determining that the external colorant supply can be emptied into the reservoir;
an unrestricted fill mode in which the reservoir is filled from the external colorant supply regardless of whether the external colorant supply can or cannot be emptied into the reservoir; and
responsive to temporary connection of the external colorant supply to the printing device, controlling, by the printing device, filling of the reservoir from the external colorant supply in accordance with the selected fill mode.

2. The method of claim 1, further comprising, responsive to temporary connection of the external colorant supply to the printing device, determining, by the printing device, an amount of colorant within the external colorant supply and an available colorant capacity of the reservoir,
wherein filling of the reservoir from the external colorant supply in accordance with the selected fill mode comprises, in response to determining that that the selected fill mode is the restricted fill mode, transferring the colorant from the external supply to the reservoir responsive to the available colorant capacity being equal to or greater than the amount of colorant within the external colorant supply.

3. The method of claim 1, further comprising, responsive to temporary connection of the external colorant supply to the printing device, determining, by the printing device, an amount of colorant within the external colorant supply and an available colorant capacity of the reservoir,
wherein filling of the reservoir from the external colorant supply in accordance with the selected fill mode comprises, in response to determining that that the selected fill mode is the unrestricted fill mode, transferring the colorant from the external colorant supply to the reservoir regardless of whether the available colorant capacity is greater or less than the amount of colorant within the external colorant supply.

4. A non-transitory computer-readable data storage medium storing program code executable by a printing device to perform processing comprising:
in response to temporary connection of an external colorant supply to the printing device, determining an amount of colorant within the external colorant supply, an available colorant capacity of a reservoir, and a currently selected fill mode of the printing device; and
in response to determining that the currently selected fill mode is a restricted fill mode, transferring the colorant from the external colorant supply to the reservoir responsive to the available colorant capacity of the reservoir being no less than the amount of colorant within the external colorant supply.

5. The non-transitory computer-readable data storage medium of claim 4, wherein transferring the colorant from the external colorant supply to the reservoir responsive to the available colorant capacity of the reservoir being no less than the amount of colorant within the external colorant supply comprises:
comparing the available colorant capacity of the reservoir to the amount of colorant within the external colorant supply;
in response to determining that the available colorant capacity is equal to or greater than the amount of colorant within the external colorant supply, transferring the colorant from the external colorant supply to the reservoir; and
in response to determining that the available colorant capacity is less than the amount of colorant within the external colorant supply, refusing to transfer the colorant from the external colorant supply to the reservoir.

6. The non-transitory computer-readable data storage medium of claim 5, wherein determining the amount of colorant within the external colorant supply comprises reading data indicating the amount of colorant within the external colorant supply from a memory of the external colorant supply,
and wherein the processing further comprises, after transferring the colorant from the external colorant supply to the reservoir, storing data on the memory indicating that the external colorant supply is empty.

7. The non-transitory computer-readable data storage medium of claim 4, wherein the processing further comprises:

in response to determining that the currently selected fill mode is an unrestricted fill mode, transferring the colorant from the externally colorant supply to the reservoir regardless of whether the available colorant capacity of the reservoir is greater or less than the amount of colorant within the external colorant supply.

8. The non-transitory computer-readable data storage medium of claim 7, wherein transferring the colorant from the external colorant supply to the reservoir regardless of whether the available colorant capacity within the reservoir is greater or less than the amount of colorant within the external colorant supply comprises:

comparing the available colorant capacity of the reservoir to the amount of colorant within the external colorant supply;

in response to determining that the available colorant capacity is equal to or greater than the amount of colorant within the external colorant supply, transferring the colorant from the external colorant supply to the reservoir until the external colorant supply is empty; and in response to determining that the available colorant capacity is less than the amount of colorant within the external colorant supply, transferring the colorant from the external colorant supply to the reservoir until the reservoir is full.

9. The non-transitory computer-readable data storage medium of claim 8, wherein determining the amount of colorant within the external colorant supply comprises reading data indicating the amount of colorant within the external colorant supply from a memory of the external colorant supply, and wherein the processing further comprises after transferring the colorant from the external colorant supply to the reservoir, storing data on the memory indicating an updated amount of colorant equal to the amount of colorant within the external colorant supply prior to transfer minus an amount of colorant transferred from the external colorant supply to the reservoir.

10. The non-transitory computer-readable data storage medium of claim 4, determining the available colorant capacity of the reservoir comprises:

determining an amount of colorant remaining within the reservoir; and subtracting the amount of colorant remaining within the reservoir from a maximum colorant capacity of the reservoir.

11. A printing device comprising:

a reservoir of colorant;

a print engine to print using the colorant from the reservoir; and hardware logic to enable a selectable fill mode from a plurality of fill modes and, responsive to temporary connection of an external colorant supply to the printing device, control filling of the reservoir in accordance with the selected fill mode, wherein the fill modes comprise:

a restricted fill mode in which the reservoir is filled from the external colorant supply responsive to determining that the external colorant supply can be emptied into the reservoir; and an unrestricted fill mode in which the reservoir is filled from the external supply regardless of whether the external colorant supply can or cannot be emptied into the reservoir.

12. The printing device of claim 11, wherein the hardware logic is to further, responsive to temporary connection of the external colorant supply, determine an amount of colorant within the external colorant supply and an available colorant capacity of the reservoir, and wherein the hardware logic is to control filling of the reservoir in accordance with the amount of colorant within the external colorant supply and the available colorant capacity of the reservoir as well as the selected fill mode.

13. The printing device of claim 12, further comprising:

a port fluidically coupled to the reservoir and to which the external colorant supply is temporarily connectable;

a port sensor to detect the temporary connection of the external colorant supply to the port; and a reservoir sensor to detect an amount of colorant remaining within the reservoir, wherein the hardware logic is to determine the available colorant capacity of the reservoir as a maximum colorant capacity of the reservoir minus the detected amount of colorant remaining within the reservoir.

14. The printing device of claim 12, further comprising:

a pump to transfer colorant from the external colorant supply to the reservoir, wherein the hardware logic is to control filling of the reservoir by causing the pump to transfer the colorant from the external colorant supply to the reservoir in accordance with the amount of colorant within the external colorant supply, the available colorant capacity of the reservoir, and the selected fill mode.

15. The printing device of claim 14, wherein the hardware logic is to read data indicating the amount of colorant within the external colorant supply from a memory of the external colorant supply, and wherein the hardware logic is to further, after the pump has transferred the colorant from the external colorant supply to the reservoir, store data on the memory indicating an updated amount of colorant equal to the amount of colorant within the external colorant supply prior to transfer minus an amount of colorant transferred from the external colorant supply to the reservoir.

* * * * *